Nov. 11, 1930. E. VON LEESEN 1,781,615
PENDULUM HARDNESS TESTER
Filed Jan. 27, 1927

Inventor:
Emil von Leesen

Patented Nov. 11, 1930

1,781,615

UNITED STATES PATENT OFFICE

EMIL VON LEESEN, OF BERLIN-TREPTOW, GERMANY

PENDULUM HARDNESS TESTER

Application filed January 27, 1927. Serial No. 164,112.

My present invention relates to a hardness tester, suitable for metals, building materials, pottery and the like, with swivel pendulum hammer arranged to fall first from a determined height against the material to be tested and then, in rebounding, to carry along a hand showing the degree of hardness of the material on a scale set concentrically to the axis of the hammer. Hardness testers of this kind heretofore known have, in practice always been accompanied by a number of drawbacks or imperfections which are eliminated by my present invention.

The degree of hardness shown on the scale was often not sufficiently accurate, as it was no simple matter to set the tester for use with such accuracy that the height of fall remained uniform for all measurements. In addition the moving of the hand on the scale was too much dependent on its setting in the tester and varied with wear so that the measurements became more and more inaccurate. In testing materials with curved surfaces such as round bars, for instance, it was impossible to set the tester on the material in such a manner as to ensure a rebound of the pendulum hammer in a radial direction, as is necessary for exact determination of the degree of hardness. Another drawback was that clogging took place by means of dirt and other foreign substances getting into the mechanism through the opening for the hammer head. In transportation of the machine, damage occurred, especially in hanging the pendulum which worked loose from its stops in its highest position and could then swing free in both directions. Heretofore it was necessary to rotate the entire machine, in order to get the pendulum back into its highest position from the state of equilibrium. The disadvantage of this was that several measurements could never be taken in succession on the material while the tester was being adjusted.

It is therefore one of the objects of the present invention to overcome the above objections and disadvantages, to provide a simple and practical mechanism which will be reliable and efficient in use and operation, and to permit the accurate determination of the degree of hardness of various materials.

Other objects will be in part obvious and in part hereinafter pointed out in connection with the accompanying sheet of drawings illustrating one of the various possible embodiments of the present invention.

The invention accordingly consists in the features of construction, the combination of parts, and in the unique relation of the various members and the relative proportioning and disposition thereof, all as more clearly outlined herein.

To enable others skilled in the art to fully comprehend the underlying features thereof, in order that they may embody the same, by numerous modifications in structure and relation contemplated by this invention, drawings depicting a preferred form of the invention have been annexed as part of this disclosure, and in such drawings like characters of reference denote corresponding parts throughout all the views, of which—

Figure 1:
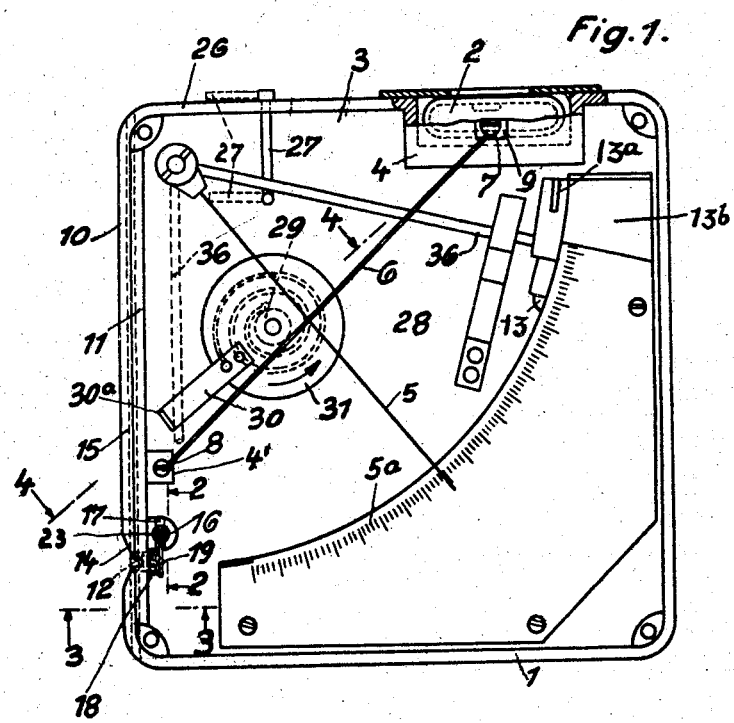
Fig. 1 is in elevational view of a hardness tester, natural size, with cover removed.
Figure 7:
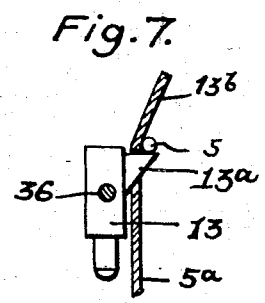
Fig. 7 is a detail view, partly in section, showing the pointer release mechanism.

In order to insure a uniform falling height of the pendulum at every measurement, a spirit level 2 is provided on the tester perpendicular to the swinging direction at the instant of rebound on the tested piece, said spirit level showing the correct falling height of the pendulum hammer corresponding to the graduations of the scale when the tester is set up.

This spirit-level 2 is lodged parallel to the base 1 in a block 4 cast on the case 3, and when the tester is set up, the exactly horizontal position, that is to say, the correct falling height of the pendulum corresponding to the graduation of the scale, can be determined by means of said spirit level 2.

In order to measure a regular and adequate movement of an indicating hand 5, the latter is submitted to double friction from two opposed directions and perpendicular to its moving plane, said friction always operating in the moving plane and opposite the moving direction of the hand or pointer, and this friction is sufficient to arrest the hand and hold the same in its arrested position into which it is brought by the pendulum and its movement. Over the hand 5 made of fine steel wire a wire 6 is drawn diagonally through the case and secured by means of screws 7 and 8 to the blocks 4' and 9 respectively: these blocks being cast in one piece with the case. This wire 6 rubs against the hand 5 and presses it with its point against the scale 5ª, so that the hand glides with friction on the scale as well as on the wire, thus ensuring a uniform and regular working of the hand.

If the material to be tested happened to have curved surfaces, such as a cylindrical bar or a sphere, in order to center these pieces properly for a radially directed rebound of the pendulum hammer, two V-shaped grooves crossing each other at right angles in the center of the opening in the case for the passage of the hammer head are provided in the walls of the case, whereby the pendulum hammer will pass thru this opening and engage the material to be tested at right angles.

Two V-shaped grooves 14 and 15, crossing each other in the center of the aperture 12 for the semi-spherical steel hammer head 13, are cut into the side wall 10 and are provided with a reinforcing batten 11 cast on the inner side. When testing pieces with curved surfaces these are centered in said grooves, in order to ensure a radially directed rebound of the hammer head.

Figures 2, 3:
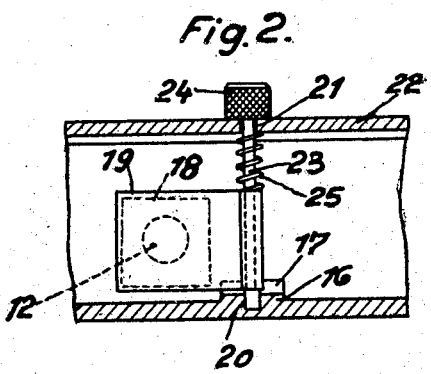
Fig. 2 is a partially cross-section through the case with cover, perpendicular to the base on line 2—2, Fig. 1, and shows on an enlarged scale the arrangement of the protecting flap in closed position.
Fig. 3 is a partially cross-section, parallel to the base on line 3—3, Fig. 1, and shows the arrangement of the protecting flap.
Figure 4:
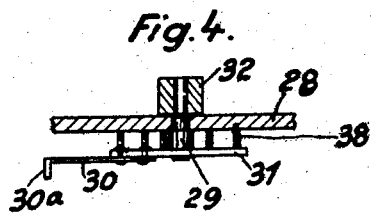
Fig. 4 is a partially cross-section on line 4—4, Fig. 1, through the back wall of the case with turning disc for bringing back the pendulum to its highest position.

In order to close the opening in the case thru which the hammer head passes thereby to exclude foreign bodies from entering the case, a flap 19 operated from without the case and preferably covered with cloth or velvet 18 is arranged on the case of the tester as shown more particularly in Figs. 2 and 3.

A slit 17 parallel to the side wall 10 is milled or planed into an eye 16 cast on the rear wall of the case. A protecting flap 19 covered with velvet or similar material 18 is rigidly secured to a shaft 23 journalled in the bore-holes 20 and 21 of eye 16 and cover 22. By means of a corrugated knob 24 the flap can be closed or opened from the outside, swinging through an angle of 180°. Before the flap can be moved, it must first be withdrawn from slit 17 which holds it locked in either position against the pressure of spring 25 by means of the corrugated knob 24.

After using the tester, the pendulum should be locked in its highest position to prevent displacement, and accordingly a locking device is provided for this purpose.

There is accordingly provided a hook-shaped lever 27 journalled in the upper wall 26 of the case 3 whereby the pendulum is locked after use.

The pendulum may be brought back to its highest position by means of a lever and associated mechanism without necessitating the removal of the tester from the piece to be tested, and this mechanism is also adapted to return to normal position when released.

On the rear wall 28 of the case is a turn disc 31 provided with an arm 30, and carrying bolt 29 journalled in the rear wall 28. By means of a corrugated knob 32 rigidly connected to bolt 29 the disc 31 is moved from the outside, whereby the pendulum 36 is swung back into its highest position by means of the angular piece 30ª of arm 30 and held in such position by hook 27.

By means of a second swinging lever which also returns to normal position after use under the influence of certain spring mechanism, the pointer hand may be brought back from any position to zero. There is accordingly provided a spiral spring 38 arranged back of the disc and so connected to the latter and the rear wall of the case that the disc after operation returns automatically under the influence of the spring to its position of rest where it is held.

Figure 5:
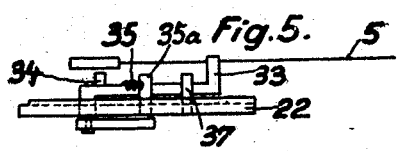
Figs. 5 and 6 are detail views illustrating means secured to cover, for swinging back the hand to zero, in sectional and overhead view of the inner surface of the cover, respectively.

On the outer wall of the cover 22 is a U-shaped lever 33 operated from without, and by means of which the hand 5 Fig. 5, can be brought from any position back to zero. This lever always returns to its position of rest under the influence of a spring 35 secured to a pin 35ª sunk in the cover 22. The displacement of this lever is limited by the two stop-pins 34 and 37.

Figure 8:
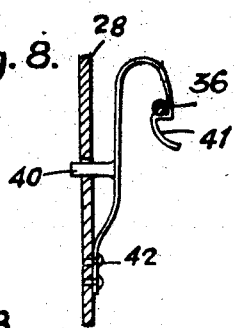
Fig. 8 is a detail view, partly in section, showing the pendulum release mechanism.

By referring to Fig. 8, it will be seen that the back of the casing is provided with a push button 40 adapted to engage a U-shaped spring catch 41 secured to the inner surface of the casing at 42 adapted to engage and hold the pendulum lever 36 in its uppermost position. When the push button 40 is depressed, the lever 36 is released from the hook like end and allowed to swing downwardly.

Figure 6:
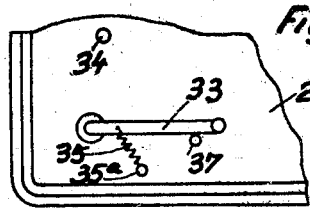

It is believed that the operation and manner of using the device above described will be clear to those skilled in the art, but a brief statement thereof is as follows. The material to be tested is first placed adjacent the casing opposite the opening thru which the hammer head 13 is adapted to pass and the lever mechanism 27 is unlocked. The hammer is then raised to its uppermost position by rotating the disk 31 and the needle 5 is set at zero by the lever mechanism shown in Fig. 6. By operating the release button 40, shown in Fig. 8, the hammer slips from its catch 41 and swings downwardly and engages the material and then rebounds, and in rebounding, the hammer drags the needle 5 upwardly by means of a nose 13ᵃ at the side of the hammer slanting downwardly and towards the front wall 10 of the case. This construction enables it to slip past the needle 5 on its falling movement but to pick up the needle on its return. In returning the hammer to its working position above the needle after a reading has been taken, the hammer is moved upwardly by means of a setting device 30—31 together with the needle until the slanting portion 13ᵇ of the scale is reached. This portion of the scale is sloped so that the needle 5 moves away from the hammer and the hose 13ᵃ, thus becomes disengaged, after which the needle 5 may be again set to zero by means of the mechanism above described in connection with Figs. 5 and 6, and the apparatus is ready for a second operation.

What I claim as my invention and desire to secure by Letters Patent of the United States is:—

1. A pendulum hardness tester, comprising, in combination, a frame, a pendulum carried on said frame, a hammer head carried by said pendulum, a hand oscillatorily carried on said frame means for automatically coupling said hand to said pendulum on its rebounding stroke, means for submitting said hand to friction acting from opposite directions against said hand, and a scale arranged in conjunction with said hand.

2. A pendulum hardness tester, comprising, in combination, a frame, a pendulum carried on said frame, a hammer head carried by said pendulum, a hand oscillatorily carried on said frame, means for automatically coupling said hand to said pendulum on its rebounding stroke, means for submitting said hand to friction acting from opposite directions against said hand, a scale arranged in conjunction with said hand, and a spirit-level mounted on said frame, whereby the correct position of the tester may be ascertained.

3. A pendulum hardness tester, comprising, in combination, a frame, a pendulum carried on said frame, a hammer head carried by said pendulum, there being an opening in said frame for the passage of said hammer head, a hand oscillatorily carried on said frame, means for automatically coupling said hand to said pendulum on its rebounding stroke, and a scale arranged in conjunction with said hand, said frame being provided with means in conjunction with said hammer head opening means whereby the object to be tested may be mounted in a radial position relative to said opening.

4. A pendulum hardness tester, comprising, in combination, a frame, a pendulum carried on said frame, a hammer head carried by said pendulum, there being an opening in said frame for the passage of said hammer head, a hand oscillatorily carried on said frame, means for automatically coupling said hand to said pendulum on its rebounding stroke, a scale arranged in conjunction with said hand, and a spirit-level mounted on said frame, whereby the correct position of the tester may be ascertained, said frame being provided with means in conjunction with said hammer head opening means whereby the object to be tested may be mounted in a radial position relative to said opening.

5. A pendulum hardness tester, comprising, in combination, a frame, a pendulum carried on said frame, a hammer head carried by said pendulum, a hand oscillatorily carried on said frame, means for automatically coupling said hand to said pendulum on its rebounding stroke, means for submitting said hand to friction acting from opposite directions against said hand, a scale arranged in conjunction with said hand, there being an opening in said frame for the passage of said hammer head, said frame being provided with means in conjunction with said head opening means whereby the object to be tested may be mounted in a radial position relative to said opening.

6. A pendulum hardness tester, comprising, in combination, a frame, a pendulum carried on said frame, a hammer head carried by said pendulum, a hand oscillatorily carried on said frame, means for automatically coupling said hand to said pendulum on its rebounding stroke, means for submitting said hand to friction acting from opposite directions against said hand, a scale arranged in conjunction with said hand, a spirit-level mounted on said frame, whereby the correct position of the tester may be ascertained, there being an opening in said frame for the passage of said hammer head, and means for closing said opening while the tester is out of use.

7. A pendulum hardness tester, comprising, in combination, a frame, a pendulum carried on said frame, a hammer head carried by said pendulum, a hand oscillatorily carried on said frame, means for automatically coupling said hand to said pendulum on its rebounding stroke, means for submitting said hand to friction acting from opposite directions against said hand, there being an opening in said frame for the passage of said hammer head, said frame being provided with means in conjunction with said hammer head opening means whereby the object to be tested may be secured in radial position relative to said opening, and means for opening and closing said opening at will.

8. A pendulum hardness tester, comprising, in combination, a frame, a pendulum mounted on said frame, a releasable device for latching said pendulum in its highest position, and also locking said pendulum in its highest position when the tester is out of use, a hammer head carried by said pendulum, a hand oscillatorily carried on said frame, means for automatically coupling said hand to said pendulum on its rebounding stroke, a scale arranged in conjunction with said hand, and a spirit-level mounted on said frame, whereby the correct position of the tester may be ascertained.

9. A pendulum hardness tester, comprising, in combination, a frame, a pendulum mounted on said frame, a releasable device for latching said pendulum in its highest position and also locking said pendulum in its highest position when the tester is out of use, a hammer head carried by said pendulum, a lever device for bringing said pendulum carrying said hammer head back to its highest position, a hand oscillatorily carried on said frame, means for automatically coupling said hand to said pendulum on its rebounding stroke, means for submitting said hand to friction acting from opposite directions against said hand, a scale arranged in conjunction with said hand, and a spirit-level mounted on said frame, whereby the correct position of the tester may be ascertained.

10. A pendulum hardness tester, comprising, in combination, a frame, a pendulum mounted on said frame, a hammer head carried by said pendulum, a hand oscillatorily carried on said frame, means for automatically coupling said hand to said pendulum on its rebounding stroke, means for returning said hand to its zero position, a scale arranged in conjunction with said hand, and a spirit-level mounted on said frame, whereby the correct position of the tester may be ascertained.

11. A pendulum hardness tester, comprising, in combination, a frame, a pendulum mounted on said frame, a releasable device for latching said pendulum in its highest position and also locking said pendulum in its highest position when the tester is out of use, a hammer head carried by said pendulum, a lever device for bringing said pendulum carrying said hammer head back to its highest position, a hand oscillatorily mounted on said frame, means for automatically coupling said hand to said pendulum on its rebounding stroke, means for returning said hand to its zero position, means for submitting said hand to friction acting from opposite directions against said hand, and a scale arranged in conjunction with said hand, there being an opening in said frame for the passage of said hammer head, said frame being provided with means in conjunction with said hammer head opening means whereby the object to be tested may be secured in a radial position relative to said opening.

12. A pendulum hardness tester, comprising, in combination, a frame, a pendulum mounted on said frame, a releasable device for latching said pendulum in its highest position and also locking said pendulum in its highest position when the tester is out of use, a hammer head carried by said pendulum, a lever device for bringing said pendulum carrying said hammer head back to its highest position, a hand oscillatorily mounted on said frame, means for automatically coupling said hand to said pendulum on its rebounding stroke, means for submitting said hand to friction acting from opposite directions against said hand, means for returning said hand to its zero position, a scale arranged in conjunction with said hand, a spirit-level mounted on said frame, whereby the correct position of the tester may be ascertained, there being an opening in said frame for the passage of said hammer hand, and means for closing said opening while the tester is out of use.

EMIL von LEESEN.